United States Patent Office 2,750,424
Patented June 12, 1956

2,750,424

MANUFACTURE OF CUMYLPHENOL

Godfrey Paul Armstrong, Epsom Downs, Thomas Bewley, Epsom, Geoffrey William Jackson, Southborough, Kent, Frederick James Bellringer, Wimbledon, London, Peter Lionel Bramwyche, London, and Frederick John Wilkins, Hull, England, assignors, by mesne assignments, to Hercules Powder Company, a corporation of Delaware No Drawing. Application May 29, 1950,
Serial No. 165,102

Claims priority, application Great Britain June 8, 1949

1 Claim. (Cl. 260—619)

The present invention relates to improvements in the manufacture of phenol by the decomposition of isopropyl benzene peroxides into acetone and phenol by means of acidic catalysts and refers in particular to the separation and receovery of phenol and other reaction products from the reaction mixture. By the expression isopropylbenzene peroxides in this specification the hydroperoxide as well as the peroxide of isopropylbenzene are to be understood.

In the process of decomposing isopropyl benzene peroxides by means of acidic catalysts, which are, for instance, aqueous mineral acids, strong organic acids such as sulphonic acids, hydrogen ion exchange materials and acid treated activated earths, not only phenol and acetone are formed but it has been found that considerable quantities of other compounds such as alphamethylstyrene and also cumyl phenol are produced. The recovery of these byproducts, therefore, is important as it contributes considerably to the economic success of the process. Alphamethylstyrene can be used for the production of polymethylstyrenes or it may be reconverted into isopropyl benzene by suitable hydrogenation and then be recycled to the oxidation process to produce further quantities of isopropyl benzene peroxides and ultimately again phenol therefrom. This hydrogenation is the more economical the higher the concentration of the alphamethylstyrene in the fraction which is to be subjected to said hydrogenation. The cumyl phenol on the other hand is itself a valuable product or it may be decomposed in order to furnish additional amounts of phenol. The cumyl phenol is found in the residue which remains after all the products with lower boiling points have been removed from the decomposition reaction mixture.

The production of isopropyl benzene peroxides is most conveniently effected by oxidising isopropyl benzene in the liquid phase at elevated temperatures by means of molecular oxygen. The best efficiencies in the oxidation reaction are obtained when only a part of the isopropyl benzene is converted into the corresponding peroxides which consists mainly of the hydroperoxide, together with a small proportion of isopropyl benzene peroxide which is also formed. This oxidation reaction results, therefore, in a solution of the isopropyl benzene peroxides in unchanged isopropyl benzene and it is very economical for the manufacture of phenol to bring such a solution of the peroxides in isopropyl benzene into contact with acidic catalysts to effect the decomposition of the peroxides and produce phenol and acetone. In this case besides phenol, acetone, and cumyl phenol, the decomposition reaction mixture contains unreacted isopropyl benzene and acetophenone.

The recovery from the decomposition reaction mixture of its various components and their concentration is advantageously effected by fractional distillation. When the whole decomposition product after it has been separated from the acidic catalyst is subjected to fractional distillation, the various compounds will distil over in the following sequence; acetone, isopropyl benzene if present in the reaction product, alphamethyl styrene, phenol, acetophenone and cumyl phenol. It has been observed, however, that by fractional distillation very frequently the amounts of alphamethylstyrene obtained by this process were very small whilst the high boiling residues from the fractionation had increased simultaneously with an appreciable decrease in the phenol yield.

It has now been found that the formation of high boiling residues together with the decrease in the amount of alpha-methylstyrene and phenol recovered was due to the presence of acids in the decomposition product to be distilled and that it is essential for a high recovery of alphamethylstyrene to carry out the distillation and its separation from the other components of the reaction mixture under non-acid conditions, by which in this specification it is meant that the pH value of an aqueous extract of the mixture to be fractionally distilled should be not less than 5. The determination of the pH value may be carried out with a glass electrode system.

Accordingly, this invention consists of the step in the process for the manufacture of phenol by the decomposition by means of acidic catalysts of isopropylbenzene peroxides which comprises recovering the alphamethylstyrene from the decomposition product by fractional distillation of said product under non-acid conditions, as defined above. When the decomposition is carried out with a solution of isopropylbenzene peroxides in unchanged isopropylbenzene and the acidic catalyst used consists of an aqueous acid such as sulphuric acid the decomposition product separates on standing into two layers. The top layer has an oily nature and contains as main constituents the products of the acid catalysed decomposition dissolved in unchanged isopropylbenzene. After separation from the acidic catalyst, for instance, by decantation from the aqueous acid layer, the decomposition product also contains mechanically adhering traces of the acidic catalyst by which the decomposition has been effected. This acidic catalyst may effectively be removed from the decomposition mixture by washing with a small quantity of water. The wash water then contains about 2% of phenol and about 3% of acetone which may be subsequently recovered. There are also present in the decomposer product, however, organic acids which are soluble in the oil phase, such as formic acid, which have a deleterious effect in the subsequent distillation operations. These organic acids which are soluble in isopropyl benzene are in the main produced in the oxidation step preceding the decomposition. Hitherto they have been substantially neutralised by the addition to the isopropylbenzene of alkali, which addition was found to be advantageous during the oxidation reaction. The alkali metal salts of the organic acids pass out in the form of a suspension from the oxidation reactor into the decomposer where on contact with the acidic catalyst used, especially if this catalyst is an aqueous mineral acid, the free organic acids are regenerated therefrom. These free acids cannot be completely removed from their solution in the said mixture except by the use of large amounts of water which, however, will dissolve also phenol and acetone and necessitate the recovery of these substances from the wash waters.

It has now been found that by employing a comparatively small proportion of a dilute aqueous alkali such as sodium carbonate as the washing agent, complete removal of these acids which are deleterious to subsequent distillation operations is achieved. The amounts of aqueous alkali solution used for this purpose should be adjusted in such a way that they should be sufficient to react with any free acid to give the corresponding water soluble alkali salts but insufficient to dissolve substantial amounts of phenol.

Since the said acids or their alkali metal salts are already present when the oxidation product is brought into contact with the acidic catalyst, it is an additional feature of this invention to remove said acids and salts substantially completely before the oxidation reaction product is brought into contact with the decomposing acidic catalysts by submitting the product issuing from the oxidiser to an alkali wash. This has the special advantage that no phenol or acetone is present before the decomposition takes place and therefore they cannot be taken up by the alkaline wash water. Consequently, the recovery of these compounds from the wash water is not necessary and the amount of acid to be removed by washing of the decomposer product is minimised.

The treatment of the decomposition product with an alkaline medium in order to remove therefrom any acidity is carried out according to this invention until the pH value of an extract with distilled water is not less than 5, as stated above. The mixture is then fractionated and it is preferred to carry out the distillation under diminished pressure so that the kettle temperature does not exceed 200° C. since in this way the thermal decomposition of cumyl phenol is minimised. After distilling off alphamethylstyrene phenol is recovered as the next fraction.

After the removal of alphamethylstyrene and phenol the residue contains acetophenone and cumyl phenol. This last valuable phenolic compound in the residue may be treated according to the process described in copending application Serial Number 165,101, filed May 29, 1950, now U. S. 2,715,145, issued August 9, 1955, in order to increase the overall yield of phenol, or according to an additional feature of this invention it may be isolated from said residue. This isolation may be effected by fractionating the residue under reduced pressure whilst keeping the temperature in the kettles of the stills low, preferably below 200° C. in order to avoid decomposition of the cumyl phenol. Another method of recovering the cumyl phenol from the high boiling residue is by extraction with alkali. When the separation of cumyl phenol is effected by distillation the decomposition of the cumyl phenol is considerably reduced if the high boiling residue is first flash distilled and the resulting vapours are condensed and subsequently refractionated under reduced pressure. A further modification of these methods comprises subjecting the high boiling residue first to fractional steam distillation, by which any residual phenol and acetophenone are removed before fractionating or extracting with alkali the cumyl phenol since in this way a pure product is obtained.

The following example illustrates the manner in which the process of the invention is carried out in practice:

*Example*

1000 lbs. of isopropyl benzene were oxidised with oxygen at 130° C. in a continuous manner so that the mixture leaving the reactor contained 25.3% isopropyl benzene hydroperoxide. The oxidation mixture was fed into a decomposer in which it was intimately contacted with a 45% w/w aqueous sulphuric acid. After decantation the oil, whose aqueous extract showed a pH of about 3, was washed in countercurrent with 33 lbs. of water and then in a stirred vessel with an aqueous 5 percent solution of sodium carbonate, so that the aqueous extract of decanted oil now showed a pH of 7. This carefully neutralised oil was fed into a continuous still in which acetone, together with small amounts of isopropyl benzene and light boiling material, was removed at normal pressure. The liquid leaving the bottom of the stripping still was fed to a second continuous still in which the major part of isopropyl benzene, i. e. 682 lbs. of isopropyl benzene, together with 0.54 lbs. of alphamethylstyrene and 2 lbs. phenol, was distilled off. This last still was operated at 100 mm. pressure, with a kettle temperature not higher than 120° C. The liquid leaving the still was transferred to a batch still from which, as first fraction, a small amount of isopropyl benzene (5.7 lbs.) with a little alphamethylstyrene and phenol was recovered, then in a second fraction 25 lbs. of methylstyrene in admixture with 8.3 lbs. of isopropylbenzene and 2 lbs. of phenol. The third fraction (140 lbs.) was almost pure phenol. Finally, acetophenone in admixture with phenol was recovered as a last fraction. The whole fractionation from the batch still is carried out at such a vacuum that the highest temperature reached was not above 160° C. The residue remaining in the still kettle (36.2 lbs.) was then flash distilled at 15 mms. Hg and the distillate refractionated at 5 mm. The cumyl phenol was obtained in this way in a yield of 58.9% by weight of the original residue. The fraction containing the pure cumyl phenol boiled at 182° C. at 9 mms.

We claim:

In the process for the manufacture of phenol wherein isopropylbenzene is oxidized in liquid phase at elevated temperatures with molecular oxygen to an oxidate containing isopropylbenzene peroxides, and said peroxides are decomposed by means of acidic catalysts to give a reaction mixture containing acetone, isopropylbenzene, α-methylstyrene, phenol, acetophenone, and cumylphenol, and said reaction mixture is subjected to fractional distillation at a temperature below 200° C. to recover acetone, isopropylbenzene, α-methylstyrene, phenol, and acetophenone, leaving a residue containing cumylphenol, the improvement which comprises the step of subjecting said residue to fractional distillation under reduced pressure at a temperature below 200° C. to recover cumylphenol.

References Cited in the file of this patent

UNITED STATES PATENTS

| 2,113,951 | Shuman | Apr. 12, 1938 |
| 2,438,125 | Lorand et al. | Mar. 23, 1948 |
| 2,447,414 | Kosmin et al. | Aug. 17, 1948 |
| 2,597,497 | Joris | May 20, 1952 |
| 2,628,983 | Aller et al. | Feb. 17, 1953 |

FOREIGN PATENTS

| 626,095 | Great Britain | July 8, 1949 |
| 629,429 | Great Britain | Sept. 20, 1949 |

OTHER REFERENCES

Hock et al.: Berichte der Deutches Chemisches Gesellschaft, volume 77 B, pgs. 257–264 (1944).

Lange: Handbook of Chemistry, Sixth Edition, 1946 Handbook Publishers Inc., Sandusky, Ohio.

Shriner et al.: "Identification of Organic Compounds," Third Ed. 1948, pgs. 60–61, John Wiley & Sons, New York.